117,314

UNITED STATES PATENT OFFICE.

CHARLES McILVAINE, OF PHILADELPHIA, PENNSYLVANIA.

IMPROVEMENT IN COPYING INKS FOR RULING AND PRINTING.

Specification forming part of Letters Patent No. 117,314, dated July 25, 1871; antedated July 12, 1871.

*To all whom it may concern:*

Be it known that I, CHARLES MCILVAINE, of the city of Philadelphia, in the State of Pennsylvania, have invented a new and Improved Ruling-Ink for Printers' use, whereby when paper is ruled with this ink impression copies can be made of the ruling in the same manner as of writing done in the ordinary copying writing-inks, or of printing done in the improved printers' copying-inks, patented by me October 25, 1870, United States patent No. 108,615, and of such consistency and character as not to gum or clog on the machines used by rulers and printers for such ruling.

This I accomplish by using soluble coloring matter in solution in glycerine, alcohol, and water, together with soluble gums, acids, and saccharine matter, as to accomplish the purpose set forth.

For the red I take one part of aniline red, dissolved in six parts of alcohol and one hundred and fifty parts of water, to which I add six parts of gum kino, arabic, or other soluble gum, six parts of tartaric, oxalic, citric, acetic, or other acid of like character, and six parts of glycerine.

For the purple I take one part of aniline violet or purple and other ingredients of like character and proportions and preparation as set forth for the red.

For the green I take iodine green or aniline green, one part, and other ingredients of like character and proportions and preparation as set forth for red and purple.

For blue I take one part of aniline blue soluble in water, or Prussian, or carmine of indigo, or sulphate of indigo, soluble in water, dissolved in one hundred parts of water, to which I add eight parts of alcohol, two parts of glycerine, two parts of soluble gum, four parts of saccharine matter, eight parts of acetic, tartaric, oxalic, or acid of like character.

The amount and kind of color may be varied to make shade of color required.

What I claim as my invention, and desire to secure by Letters Patent, is—

A copying-ink for printers' and rulers' use, composed of the ingredients, *i. e.*, a soluble coloring matter in solution in glycerine, alcohol, and water, together with soluble gums, an acid, and saccharine matter, substantially as specified.

CHARLES McILVAINE.

Witnesses:
JOHN E. ALEXANDER,
J. H. W. M. HANSELL.